Jan. 22, 1924.
J. KILSHAW
1,481,265
MIXER OR EMULSIFYING MACHINE
Filed May 3, 1922    4 Sheets-Sheet 1
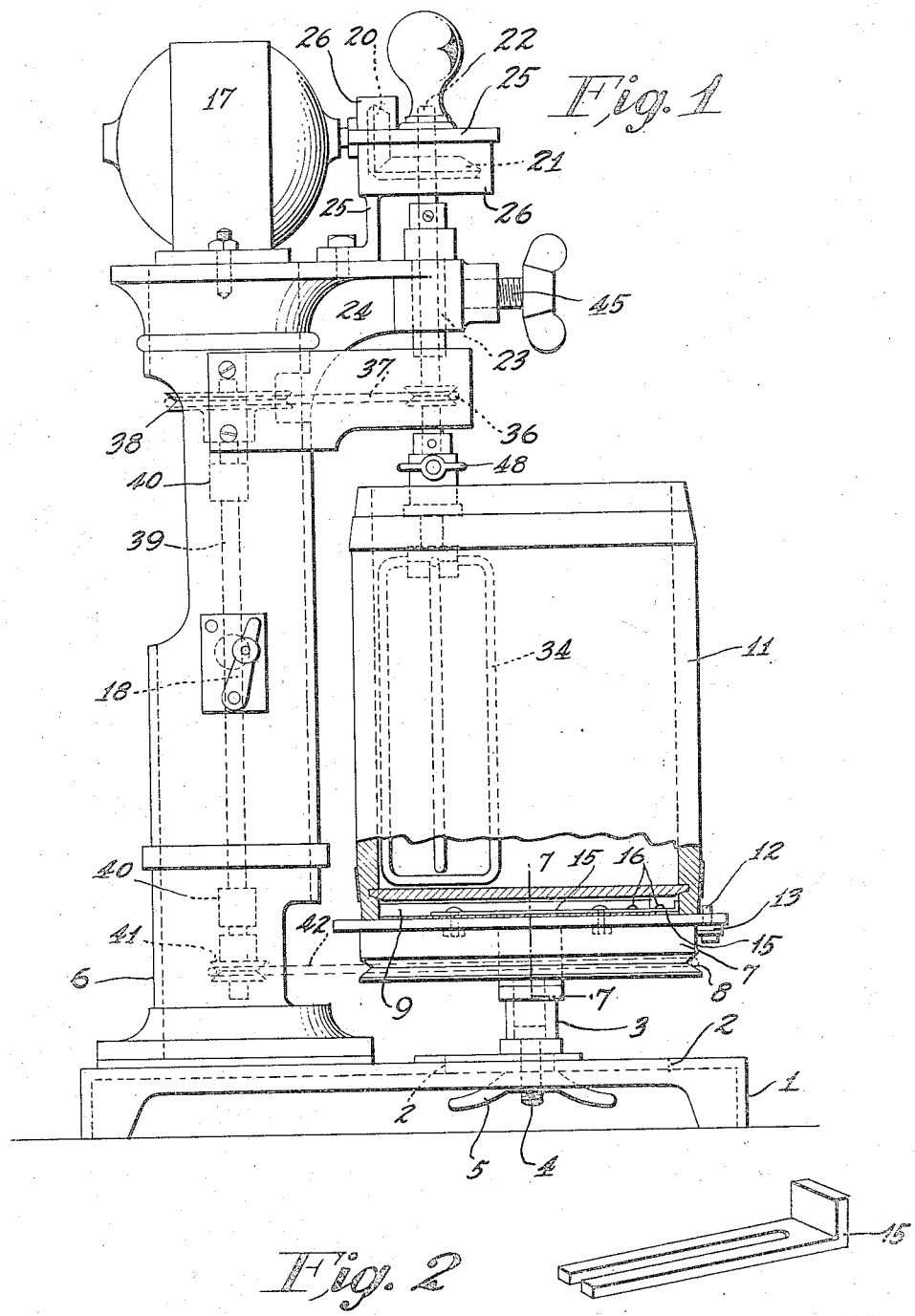
Fig. 1
Fig. 2
INVENTOR.
John Kilshaw
BY 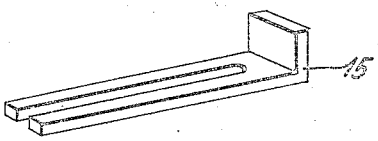
ATTORNEYS.

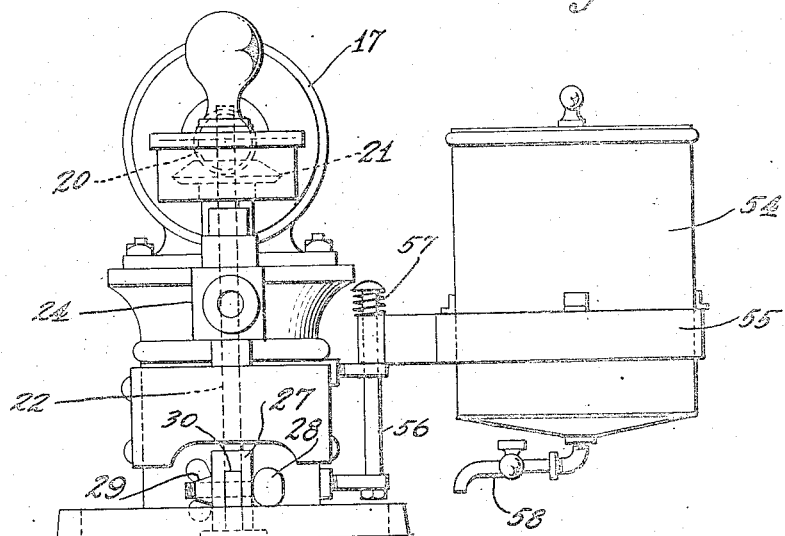
Fig. 3
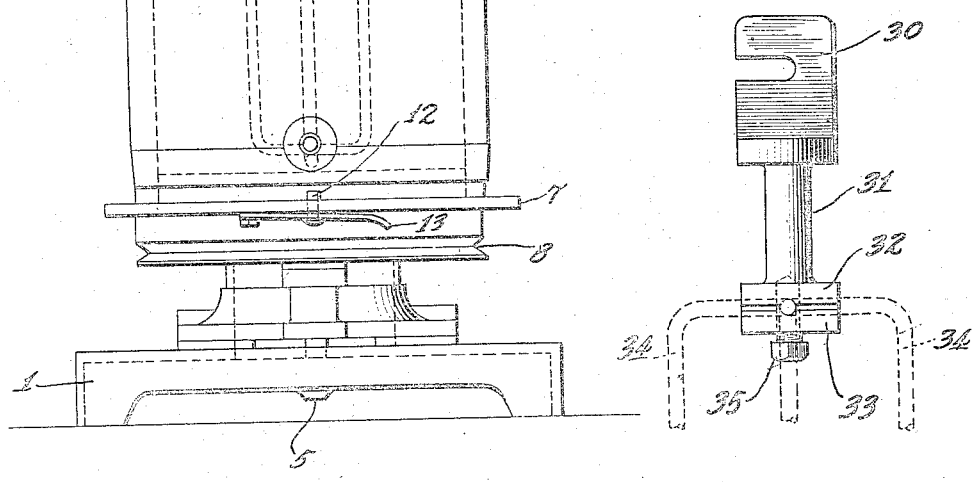
Fig. 5
Fig. 8
INVENTOR.
John Kilshaw
BY Jas. H. Griffin
ATTORNEYS.

Jan. 22, 1924.
J. KILSHAW
1,481,265
MIXER OR EMULSIFYING MACHINE
Filed May 3, 1922    4 Sheets-Sheet 3
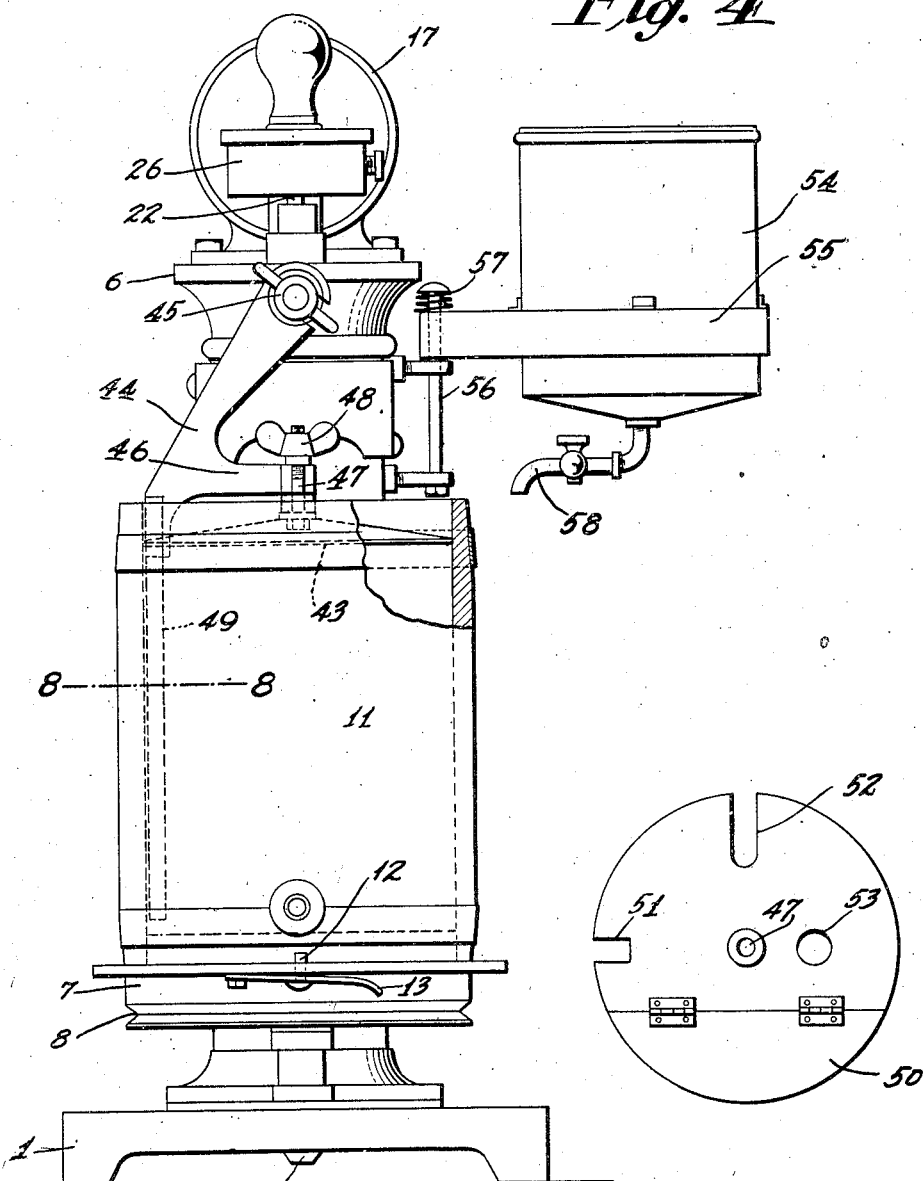
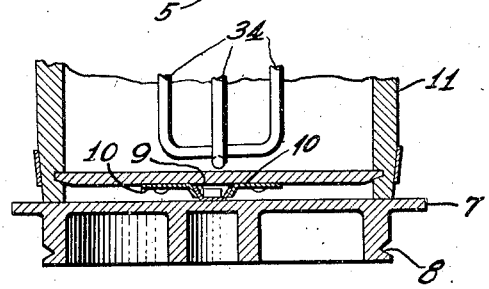
INVENTOR.
John Kilshaw
BY Jas. H. Griffin
ATTORNEYS.

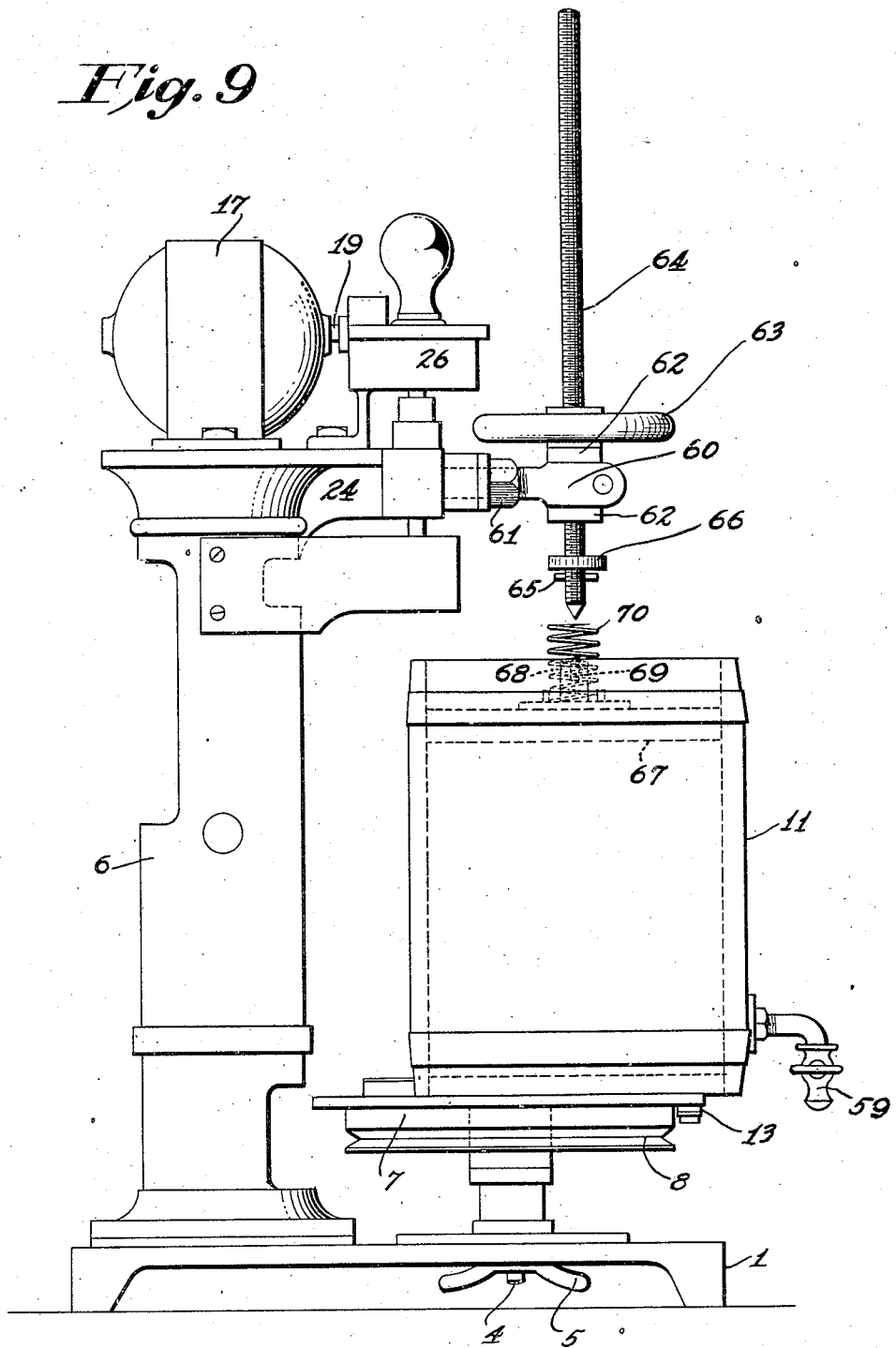

Patented Jan. 22, 1924.

1,481,265

UNITED STATES PATENT OFFICE.

JOHN KILSHAW, OF BROOKLYN, NEW YORK, ASSIGNOR OF THREE-FOURTHS TO MICHAEL A. DUPPER, OF BROOKLYN, NEW YORK.

MIXER OR EMULSIFYING MACHINE.

Application filed May 3, 1922. Serial No. 558,257.

*To all whom it may concern:*

Be it known that I, JOHN KILSHAW, a citizen of the United States, residing at New York city, borough of Brooklyn, in the county of Kings and State of New York, have invented a certain new and useful Mixing or Emulsifying Machine, of which the following is a specification.

This invention is a machine adapted more particularly for the beating of creams, the emulsifying of mayonnaise or dressing, or for the mixing of bread, although capable for general use in mixing, emulsifying or beating liquids or some solids.

Mixing machines have been used heretofore and the object of the present invention is to simplify and improve construction and to produce a more efficient device for carrying out its intended purposes.

In its preferred practical embodiment, the machine of the present invention comprises a bed on which is mounted a rotatable table adapted to carry a receptacle for containing the materials to be beaten or emulsified. A standard mounted on the base forms a support for a motor with which is associated a drive shaft adapted to rotate the rotatable table and also to actuate a beater or agitator depending into the receptacle, so that the material in the receptacle is beaten or agitated while the receptacle is bodily rotated to bring all parts of the material contained therein under the operation of the beater.

The machine is so constructed that the table may be adjusted to receive receptacles of different sizes and is therefore so constituted that the beater may be removed and a manually operable plunger or piston associated with the receptacle for the purpose of forcing the beaten or stirred material through a discharge outlet in the container. The materials may be precluded from adhering to the sides of the receptacle by means of a stationary scraper which bears against the interior walls of the receptacle and scrapes the material therefrom as the receptacle rotates. The parts are so associated that the material removed from the walls by the scraper is fed directly into the beater in order that all parts of the material may be acted upon and precluded from unduly stiffening or hardening.

In operating on some materials, splashing is apt to result and accordingly the receptacle is preferably provided with a cover which I prefer to mount against rotation and which cover is supported independently of the receptacle. The cover is apertured to permit the scraper to extend into the receptacle and is further provided with means to permit the introduction of material into the receptacle without removing the cover. Such additional material may be contained in a supply tank or reservoir, the outlet of which may be shifted into a position to discharge the contents of the tank into the receptacle or moved to a position where it will be out of the way when the machine is in normal operation.

Features of the invention, other than those specified, will be apparent from the hereinafter detailed description and claims when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of a machine embodying the present invention, certain portions thereof being illustrated in section in the interest of clearness.

Figure 2 is a detail perspective of one of the elements of the construction shown in Figure 1.

Figure 3 is an elevation of the machine shown in Figure 1 as viewed from the right hand side of Figure 1.

Figure 4 is a view corresponding to Figure 3, but illustrating in addition thereto means for supporting the cover of the receptacle and scraper. In this view the beater is not shown in dotted lines as in Figure 3 although present in the construction.

Figure 5 is a detail view of one of the elements employed in securing the beater detachably to its operating shaft or spindle.

Figure 6 is a plan view of the cover of the receptacle.

Figure 7 is a section on the line 7—7 of Fig. 1.

Figure 8 is a section on the line 8—8 of Fig. 4; and,

Figure 9 is a view similar to Figure 1, but showing the receptacle partially removed and means cooperating therewith for discharging the finished material from the receptacle.

Referring to the drawings 1 indicates a base of any suitable form. The base 1 is slotted as at 2 and on the base rests a carrier 3 provided with a depending threaded stem 4 which passes through the slot 2 and is adapted to receive a wing nut 5 which when secured firmly against the under side of the base locks the carrier in predetermined position. When the wing nut 5 is loosened the carrier may be slid longitudinally of the slot 2 to a greater or lesser distance away from a standard 6 mounted in upstanding position on one end of the base, for reasons hereinafter more fully explained.

Mounted for rotation on the carrier 3 is a rotatable table 7 shown in section in Figure 7. This rotatable table 7 may be mounted on ball bearings or other suitable antifriction devices on the carrier 3 so as to adapt the table for free rotary movement while the carrier remains stationary. The table 7 is provided near its outer periphery with a depending skirt in which is formed an annular groove 8 adapted to receive a belt by means of which the table is rotated. Mounted on top of the table 7 and extending diametrically across the same is a fixed dove tail guide 9 and with this dove tail guide is adapted to cooperate complementarily formed guides 10 mounted on the under side of a receptacle 11, which will hereinafter be referred to as the tub. The tub may be of any suitable form, but is preferably cylindrical. The guides 10 are mounted on the bottom of the tub and the tub is adapted to be slid on to the table 7 in such manner as to bring the guides 10 into engagement with the guide 9, so that when the tub has been slid into coaxial relation with the table, said guides will cooperate with one another to hold the tub firmly on the table and preclude tilting of the former on the latter. The tub is locked against sliding off of the table by means of a pin 12 mounted on a spring 13, which spring serves to hold the pin in the path of the tub to lock the tub on the table but may be withdrawn in order to allow of the removal of the tub. A stop plate 15 provided with an upturned end as shown in Figure 2 is secured to the top of the table by screws 16, so that when the tub is moved on to the table, it engages with the stop plate 15 and is locked between the stop plate and the spring pressed pin 12. The stop plate 15 may be adjusted by loosening the screws 16.

The standard 6 is skeletonized and supports on its top a motor 17 which is controlled by a switch 18 and mounted in any suitable position on the machine. The armature shaft 19 of the motor extends in a horizontal direction and has secured thereto a bevel gear 20, which meshes with a bevel gear 21 fixed on a vertical shaft 22. The vertical shaft has a long bearing 23 in a bracket 24 below the gear 21, while the upper end of the shaft has a bearing in a bracket 25. I preferably house the gears 20 and 21 within a gear case 26, which may be cast with the bracket 25 or may, if desired, be in the form of a sheet metal casing secured to such bracket. The shaft 22 projects downwardly beyond the bearing 23 and carries at its lower end a forked coupling member 27, which is bifurcated as shown and through which a clamping screw 28 extends. A wing nut 29 is threaded upon the clamping screw and serves to flex the arms of the coupling together to bind to the coupling member 27 the upper hook end 30 of a beater support 31. The lower end of the beater support is provided with an enlarged head 32 having semi circular grooves extending at right angles across the lower face thereof and with this face is adapted to be associated a clamping jaw 33 similarly formed. The beater 34 is in the form of a cage of circular wire cross section and the upper end of this cage is adapted to be engaged with the semi circular channels in the head 32 and clamping jaw 33 and the binding screw 35 thereafter inserted and screwed up tightly in order to draw the clamping jaw toward the head 32 and clamp the top of the beater firmly between these parts.

It will of course be understood that while the beater construction is that preferred that beaters of different shape or formation may be used that they may be mounted on the support 31 in other ways without departing from this invention.

When the parts are associated as described, it will be apparent that the operation of the motor will cause the shaft 22 to be rotated through the bevel gears 20 and 21 and that such shaft will impart rotation to the beater 34, so that it will be rotated at a relatively high speed. While the tub may remain stationary during this operation, I prefer to rotate the same and accordingly provide on the shaft 22 a pulley 36 which is adapted to drive through a belt 37 a pulley 38 fixed on a shaft 39. The shaft 39 is mounted to rotate in suitable bearings 40 fixed on the standard 6 and carries at its lower end a pulley 41 around which passes a belt 42, which also encircles the groove 8 in the skirt of the rotatable table. The belt 42 may be either straight or crossed depending upon the direction in which it is desired to rotate the tub, but, in practice, I preferably rotate the tub in the same direction as the beater, but at a slower speed.

Thus when the parts are operating in normal operation, the tub will be rotated at a slow speed to bring all parts of the material contained in the tub under the action of the beater, while the beater will be operated at a relatively high speed to thoroughly beat such material for the purpose of effecting complete emulsification, this being particularly true when salad dressings or mayonnaise and other similar substances are being mixed.

In order to preclude splashing of the material during the beating operation, the tub may be provided with a cover 43 best shown in Figures 4 and 6 and this cover is preferably so mounted as to be stationary while the tub is rotated. To this end, I provide a supporting bracket 44, the upper end of which is hook shaped and is adapted to hook over the shank of a wing screw 45 (Figure 1), which threads into the end of the bracket 24. When this screw is tightened, the supporting bracket 44 will be firmly secured in position. The supporting bracket is provided with an arm 46, which has a bifurcated end adapted to receive the threaded shank 47 of the cover 43 and on the top of this shank a wing nut 48 is secured to tightly clamp the cover of the arm 46 and rigidly support the cover on such arm. The cover is otherwise without support and is merely suspended in the top of the tub.

The bracket 44 furthermore carries a scraper 49, which is rigidly mounted on the bracket and extends downwardly into the tub as shown in Figure 4. From Figure 8, it will be apparent that the scraper tightly hugs the interior of the tub and the sharp edge of the scraper scrapes the material from the sides of the tub and feeds it inwardly into the beater, so that the caking of the material on the side of the tub is thus precluded. In practice the scraper is positioned relatively close to the beater so that it will deliver the material from the side of the tub directly into the beater during the normal operation of the device.

The cover is best shown in Figure 6 and embodies a hinged section 50, which may be raised when it is desired to inspect the material in the tub in order to determine whether the mixing has proceeded to the desired extent. The cover is cut away at 51, so as to permit the scraper to extend into the tub and is further cut away at 52 and through this opening the holder 31 of the beater extends. An additional hole 53 is provided with a cover and material may be introduced into the tub through this hole.

Thus in the making of salad dressings, mayonnaise, etc., it frequently becomes desirable to add more oil. This oil may be contained in accordance with this invention in a supply tank 54, which is suspended in a bracket 55 pivoted on the rod 56. A spring 57 normally precludes the bracket 55 from turning on its pivot, but when desired such bracket may be swung so as to bring the outlet nozzle 58 of the tank over the opening 53 for the purpose of permitting oil to be discharged into the tub while the beater is in operation and without removing the cover.

It will be understood that while I have especially referred to the emulsifying of mayonnaise dressings, and have described the tank as adapted to contain various olive oils, that these statements are for illustrative purposes only and that the tank may contain other materials and the tub may be employed for mixing or emulsifying other substances and dressings.

It frequently becomes desirable to remove the treated product from the tub without removing the tub from the table and the tub is accordingly provided with a valved outlet cock 59 near its bottom. If the material in the tub is light and more or less liquid in character, it will freely flow from the cock 59 when the valve thereof is opened. However, some materials become so stiff when operated upon that they have to be forced from the tub and when this is necessary I proceed as follows.

The arm 44 is first removed carrying with it the cover 43 and the scraper 49 and thereafter the lock nut 29 is loosened so that the beater support 31 together with the beater may be removed. Thereafter I attach to the end of the bracket 24 a holder 60 which is secured to the bracket 24 by bolts 61. In the holder 60, the hub 62 of a hand wheel 63 is mounted to freely revolve but precluded from longitudinal movement and through such hub extends a threaded rod 64, the lower end of which carries a pin 65 and immediately above the pin an enlarged collar 66.

After the beater is removed a piston 67 is adapted to be positioned in the top of the tub and rest upon the material therein. On top of this piston is a rigid sleeve 68 notched out at 69 so that when the hand wheel 63 is rotated to lower the screw 64 the pin 65 will interlock with the notches 69 and thus lock the screw against rotation to the sleeve 68. A spring 70 is coiled about the sleeve 68 and extends above the top thereof so as to engage with the collar 66. As the screw 64 is depressed through rotation of the hand wheel 63 the collar first engages with the spring 70 and after depressing the same, the pin 65 engages with the notches 69. By rotating the wheel 63 the piston 67 may be forced down to place the material under pressure and cause it to be exuded through the cock 59. By virtue of the spring 70 the operations of the hand wheel may be intermittent since the screw will operate through the spring to produce constant pressure on the piston. The spring is preferably made quite heavy so that it will have considerable force and accordingly the pressure exerted by the piston upon the material will be substantially constant. This is an important feature from a practical standpoint since one workman may have several machines in charge and may go from one machine to another, screwing down the hand wheels 63 to place the spring 70 under tension so that such springs may continue the downward pressure of the pistons while other machines are operated upon.

In practice the belt 42 is preferably made of elastic material or may if desired be in the form of a coiled spring whereby its length may be varied. This construction permits of the adjustment of the rotary table 7 longitudinally of the slot 2 to enable tubs of various diameters to be employed in connection with the table. Moreover, the table may be shifted in the manner described to adjust the relation of the beater within the tub. That is to say, the tub may be shifted to bring the beater closer to or further away from the side wall of the tub. The elastic belt permits of this adjustment while assuring proper drive at all times.

Having thus fully described my invention, what I claim as new and desire to secure by Letters Patent, is:

1. A machine of the character described embodying an agitator, means for rotating the agitator at a relatively high speed, a rotatable table adapted to support a tub into which the agitator is adapted to extend, means for rotating the table in the same direction as the agitator but at a lesser speed, and means for bodily shifting the table in a lateral direction to control the position of the agitator in the tub.

2. A machine of the character described embodying a bed, a standard rigid with the bed, a main shaft mounted for rotation on the standard, and means for driving the main shaft, in combination with a turn table mounted for rotation on the bed and also adapted for lateral adjustment thereon, a counter shaft, driving connections between the main shaft and the counter shaft, and driving connections between the counter shaft and the turn table, said driving connection being proportioned to rotate the table at a lesser speed than the main shaft, and an agitator carried by the main shaft and adapted to project into a tub supported on the main shaft.

3. A machine of the character described embodying a bed, a standard rigid with the bed, a main shaft mounted for rotation on the standard, and means for driving the main shaft, in combination with a turn table mounted for rotation on the bed and also adapted for lateral adjustment thereon, a counter shaft, driving connections between the main shaft and the counter shaft, and driving connections between the counter shaft and the turn table, said driving connection being proportioned to rotate the table at a lesser speed than the main shaft, an agitator carried by the main shaft and adapted to project into a tub supported on the main shaft, and a plate rigidly supported on the standard and adapted to close the top of the tub to preclude splashing of the contents thereof.

In testimony whereof I have signed the foregoing specification.

JOHN KILSHAW.